Sept. 25, 1951     J. J. McGILLIS ET AL     2,569,110
LIQUID CONTROL FOR STORAGE TANKS
Filed Oct. 22, 1946                     2 Sheets-Sheet 1
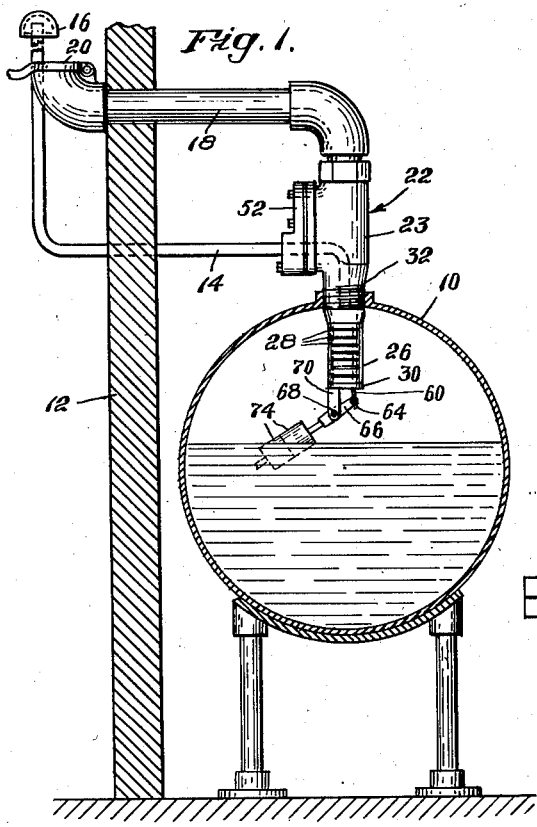
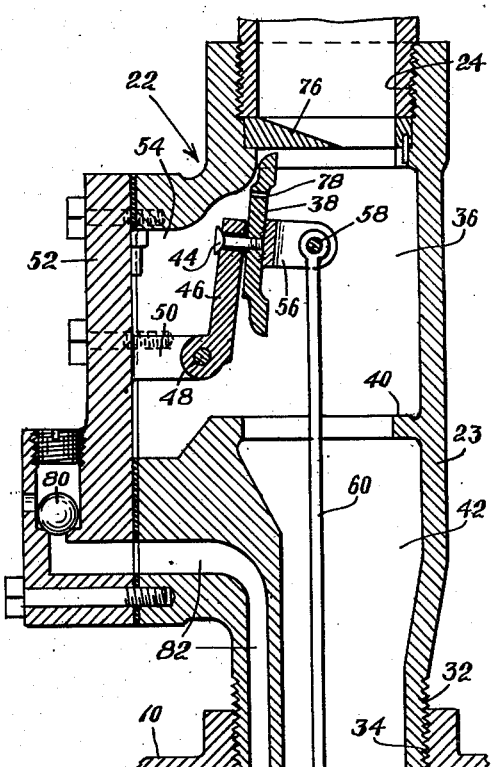
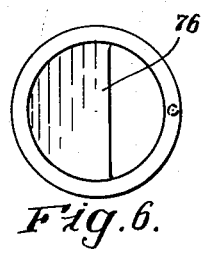
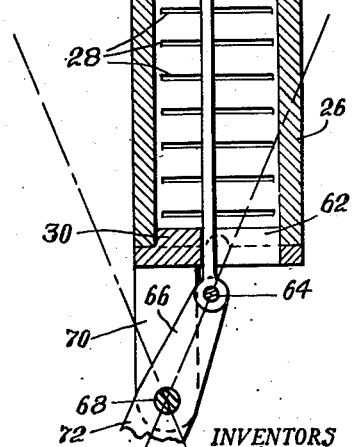
INVENTORS
John J. McGillis
Hugh F. McGillis
BY their Atty.
John H. McKenna

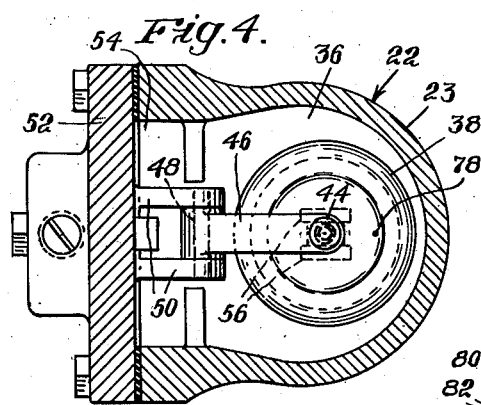
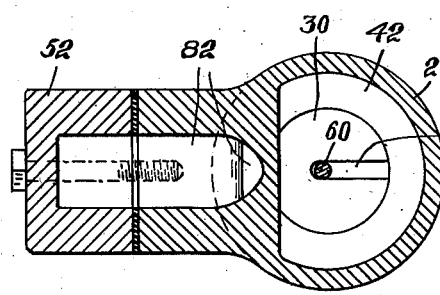
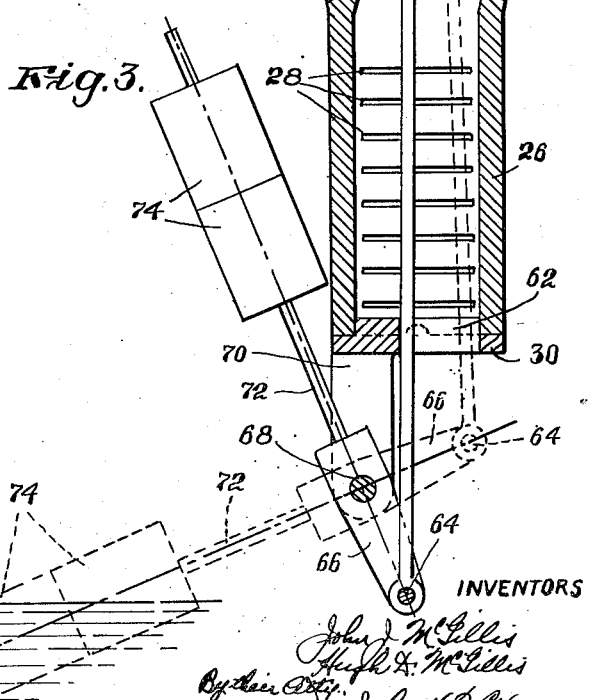

Patented Sept. 25, 1951

2,569,110

UNITED STATES PATENT OFFICE 2,569,110

LIQUID CONTROL FOR STORAGE TANKS

John J. McGillis and Hugh D. McGillis, Brockton, Mass.

Application October 22, 1946, Serial No. 704,838

5 Claims. (Cl. 137—68)

This invention relates to improvements in liquid control mechanism for storage tanks and the like. More particularly it relates to mechanism for stopping substantially all inflow of liquid from a supply conduit to a storage tank when a predetermined level of liquid has been reached in the tank, and for quickly draining into the tank such liquid as may have been trapped under pressure in the supply conduit due to closing of the supply conduit at a location more or less remote from the tank.

The invention has a special utility in connection with the filling and replenishing of oil storage tanks which customarily are located in the basements of buildings, or under ground, with their fill pipes extending to locations relatively remote from the tanks, to which fill pipes oil is delivered from a valve-controlled supply truck hose, or the like.

Various devices have been proposed heretofore for giving a signal to the truckman when a predetermined oil level has been reached in a storage tank so that the supply may be cut off at the hose nozzle, or at the truck and, in absence of a valve in the fill pipe, oil in the fill pipe can drain into the tank with no appreciable pressure being built up to react and spill oil when the hose connection to the fill pipe is broken. However, it frequently happens that such a signal is not heard or is ignored, with the result that tanks become over-flowed with serious results.

Also, float actuated valves in the fill pipes have been proposed heretofore for closing the fill pipe when a predetermined level of liquid is reached in a tank. But the closing of such valves, and the continued delivery of oil to the fill pipe, result in pressure build-up in the fill pipe so that when the hose valve ultimately is closed, oil under pressure is trapped in the fill pipe and reacts to discharge oil when the hose is disconnected.

It is among the objects of the present invention to provide liquid control mechanism wherein a float-actuated valve responds to shut off inflow of oil or other liquid to a storage tank, and wherein the valve snaps open again following closing of the supply line at a remote location, thereby to quickly drain into the tank oil which may have been trapped between the remote location and the float-controlled valve.

Another object is to provide a liquid control mechanism wherein a float-actuated valve is gradually moved by the float from fully open position to partially closed position in response to rise of liquid level in a storage tank, and quickly is snapped from said partially closed position to fully closed position by pressure of the inflowing liquid, accompanied by substantial elevation of the float above the liquid level in the storage tank, whereby the float, in response to the action of gravity, re-opens the valve as soon as pressure on the inflow side of the valve drops to a predetermined pressure.

It is, moreover, a purpose and object generally to simplify and improve the structure of liquid control mechanisms and to provide more efficient and positive operation thereof, more especially in connection with the filling and replenishing of oil storage tanks.

In the accompanying drawings:

Fig. 1 is a cross-sectional view through a liquid storage tank in a building, with liquid control mechanism mounted on the tank and embodying features of the invention;

Fig. 2 is a cross-sectional view through the liquid control mechanism of Fig. 1, with the control valve open;

Fig. 3 is a view similar to Fig. 2 but showing the control valve by full lines in its closed position and showing it by broken lines in an intermediate position where it will be engaged and forcibly closed by entering liquid;

Fig. 4 is a cross-sectional view on line 4—4 of Fig. 3.

Fig. 5 is a cross-sectional view on line 5—5 of Fig. 3; and

Fig. 6 is a plan view of the baffle member.

Referring to the drawings, the invention is shown in Fig. 1 as it may be embodied for control of the filling and replenishing of an oil storage tank 10 suitably supported in the basement or elsewhere in a building, one outer wall of the building being indicated at 12. A usual vent pipe is indicated at 14 extending from the tank through wall 12 and open beneath the protective cap 16 to atmosphere.

According to the invention, the usual fill pipe 18, with a suitable capped fill opening exteriorly of the building, as at 20, has its inner end connected to the interior of a mechanism indicated generally at 22 which is mounted at a central location in the top wall portion of tank 10.

As shown in detail in Figs. 2–4, the mechanism 22 may comprise a generally tubular casting 23 having an interiorly threaded opening at 24 in its upper end, for connection thereto of the inner end of fill pipe 18, and having the nozzle portion 26 with lateral spray openings 28 in its opposite side walls. The lower or inner end of the nozzle portion 26 is closed by a suitable plug 30, or the like, which may be secured in place in any convenient manner. The casting 23 is exteriorly threaded at 32 for screwing into a top opening 34 in the tank, with the nozzle portion 26 projecting generally vertically downward interiorly of the tank, at an upper location therein, and with a substantial portion of the casting, including the opening 24, exposed exteriorly of the tank.

A valve chamber 36 interiorly of casting 23 houses a valve 38 which is operable toward and from valve seat 40 for controlling flow between chamber 36 and a flow passage 42 leading between chamber 36 and the nozzle portion 26. The valve 38 is loosely connected at 44 to one end of an arm 46 whose other end is pivotally mounted at 48 in a pair of ears 50 which project inward from a cover plate 52 which closes an access opening at 54 into chamber 36. Hence the valve is mounted for swinging movements about pivot 48 and, because of its loose connection at 44, it can adjust itself on seat 40 relative to its carrying arm 46.

The under or inner side of valve 38 has a pair of depending ears 56 to which is pivotally connected at 58 the upper end of an operating rod 60 which extends within nozzle portion 26 and loosely out through an opening 62 in the end closure 30. The projecting end of rod 60 is pivotally connected at 64 to the short arm 66 of a lever which is pivoted at 68 on a pair of ears 70 depending from the closure 30. The longer arm 72 of the lever has one or more float members 74 at its end and the gravity effect on the float members and lever tending, through rod 60, to open valve 38 substantially exceeds the gravity effect on the valve tending to close it or to hold it closed. Hence, with no substantial pressure acting with gravity tending to close the valve, it will be held fully open by the float so long as the float is free to descend to its lowermost position. However, it will be obvious that gradual elevation of the float by rise of liquid level in tank 10 will cause gradual swinging of the valve towards its seat 40.

It is a feature of the invention that valve 38 moves only a predetermined distance towards its seat 40 in response to elevation of the float by rising liquid level in tank 10, and then is driven the balance of the distance to its seat by pressure of the in-flowing liquid. To this end, a baffle 76 partially closes the flow passage from opening 24 to chamber 36, so that liquid entering chamber 36 is directed past the valve 38 so long as the valve continues under the baffle 76. Hence, in Fig. 2, assuming in-flow of liquid at opening 24, the liquid will be directed past valve 38 in its full line position and will pass to the nozzle spray openings 28 for discharge into the tank in oppositely directed lateral sprays without any substantial riling of contents of the tank or deleterious forceful impingement of liquid against the tank walls. The valve can move from its fully open position of Fig. 2 to just short of its broken line position of Fig. 3, without the in-flowing liquid affecting it. However, as soon as the valve moves from under baffle 76 to its intermediate broken line position of Fig. 3, the in-flowing liquid will engage and get behind the valve to forcibly drive it the balance of the distance to its seat 40, with a consequent elevating of the float as in Fig. 3 substantially above the level of liquid in tank 10, and the float will continue thus elevated so long as the pressure on valve 38 plus the gravity effect on the valve continue to exceed the gravity effect on the float. Hence, until the hose line delivering to the fill pipe 18 is shut off, the valve will continue closed and, when the hose ultimately is shut off, a substantial amount of oil under pressure will be trapped between the hose shut-off and the valve 38. If the hose were to be disconnected from the fill pipe while this trapped-pressure-liquid condition existed, a substantial quantity of oil would be spilled at the fill pipe opening.

According to the invention, such entrapped liquid under pressure in the fill pipe 18 is drained into tank 10 as soon as the hose supply is shut off, so that the hose may be disconnected from the fill pipe without any danger of spilling of oil.

According to the invention, there is a bleeder hole 78 through the valve 38. As soon as the hose flow to the fill pipe 18 is shut off, the pressure in the fill pipe immediately is relieved through bleeder hole 78 into tank 10 and, in a matter of a few seconds, the pressure acting to hold the valve closed drops sufficiently to permit descent of the elevated float, thereby to snap the valve to a partially open position after which entrapped liquid freely drains into tank 10.

While the usual vent pipe 14 is designed to maintain the interior space in tank 10 at substantially atmospheric pressure, the locating of the outlet of the pipe exteriorly of the building where it may be conveniently accessible to children who may unknowingly plug it with a stone or other foreign matter, makes it highly desirable to provide a pressure relief means at the storage tank. The invention includes such a means in the form of a gravity seated ball 80 normally closing a conduit 82 which has its inner end opening into tank 10 and its outer end opening to atmosphere. Any substantial pressure interiorly of tank 10 causes ball 80 to be lifted from its seat to instantly relieve the built-up pressure condition.

We claim as our invention:

1. Liquid control mechanism comprising a discharge nozzle closed at one end and having an inlet opening substantially spaced from said closed end, spray openings in the side walls of the nozzle toward said closed end thereof, means providing a flow passage to said nozzle, a valve movable to open and to close said flow passage, means in said flow passage on the in-flow side of said valve for directing in-flowing liquid so that the liquid will avoid said valve so long as the valve is in any position between a fully open position and a predetermined partially open position and will engage and drive the valve to a fully closed position whenever a closing movement of the valve brings it beyond said predetermined partially open position, a float exteriorly of said nozzle and pivotally mounted adjacent to the delivery portion thereof, and means positively interconnecting said float and said valve whereby the valve is positively moved in both closing and opening directions in response to pivotal movements of said float.

2. Liquid control mechanism comprising a discharge nozzle closed at one end and having an inlet opening substantially spaced from said closed end, spray openings in the side walls of the nozzle toward said closed end thereof, means providing a flow passage to said nozzle, a pivoted valve movable to open and to close said passage and having its closing travel generally in the direction of liquid flow in said passage, baffle means in said flow passage on the in-flow side of said valve for directing in-flowing liquid so that the liquid will avoid the valve so long as the valve is in any position between a fully open position and a predetermined partially open position and will engage and drive the valve to a fully closed position whenever a closing movement of the valve brings it beyond said predetermined partially open position, a float pivotally mounted exteriorly of said nozzle adjacent to said closed end thereof, there being a slot opening through said closed end of the nozzle, and means extending slidably through said slot interconnecting the float and valve whereby the valve moves in closing and opening directions in response to pivotal movements of said float.

3. Liquid control mechanism comprising a hollow body closed at one end and having an inlet opening substantially spaced from said closed end, spray openings in the walls of said body toward the said closed end thereof, a pivoted valve in the hollow of said body between said spray openings and said inlet opening and adapted to move from a fully open position to a fully closed position in which latter position it closes said hollow body against passage of liquid to said spray openings, baffle means in the hollow of said body on the inlet side of said valve for directing liquid from said inlet opening so that the liquid will avoid the valve so long as the valve is in any position between said fully open position and a predetermined partially open position and will engage and drive the valve to said fully closed position whenever a closing movement of the valve brings it beyond said predetermined partially open position, and means connected to said valve and projecting beyond said closed end of said body for moving the valve from said fully open position to and slightly beyond said predetermined partially open position.

4. Liquid control mechanism comprising a delivery nozzle closed at one end and having an inlet opening substantially spaced from said closed end, spray openings in the side walls of the nozzle, means for mounting said nozzle interiorly of a liquid storage tank, means providing a substantial flow passage for guiding liquid under pressure to said nozzle, a pivoted valve for closing said flow passage and adapted to be held closed by the pressure liquid so long as the pressure of the liquid continues above a predetermined pressure, means for opening said valve whenever the pressure of liquid holding it closed drops to said predetermined pressure, and means for restricted escape of pressure liquid through the valve from one side to the other of the valve while the valve is closed thereby to reduce the pressure holding the valve closed to said predetermined pressure at which said valve opening means will open the valve, said valve opening means including a float mounted exteriorly of said nozzle and gravity-actuated in one direction, means extending slidably through said closed end of the nozzle positively interconnecting said float and said valve, whereby the valve is positively moved in opening direction in response to a said gravity-actuated movement of the float, and is positively moved in closing direction in response to a reverse movement of the float.

5. Liquid control mechanism comprising a nozzle having spray openings for lateral discharge of pressure liquid therefrom, means providing a substantial flow passage for guiding liquid under pressure to said nozzle, a pivoted valve movable in the general direction of flow in said passage for cutting off flow to said nozzle, means including a gravity-actuated float for opening the valve, said float being movable in opposition to gravity for effecting a closing movement of the valve, means in said flow passage whereby an initial closing movement of the valve is in response to a said movement of said float in opposition to gravity and whereby a final closing movement of the valve is effected by pressure of in-flowing liquid, said final closing movement of the valve effecting a further movement of said float in opposition to gravity, and means effective when the valve is closed for reducing the pressure of liquid acting on the valve to a value at which the force of gravity acting on the float will effect an opening movement of the valve.

JOHN J. McGILLIS.
HUGH D. McGILLIS.

REFERENCES CITED

The following references are of record in the file of this patent:

UNITED STATES PATENTS

| Number | Name | Date |
|---|---|---|
| 1,233,654 | Dziatkiewicz | July 17, 1917 |
| 1,923,574 | Hansen | Aug. 22, 1933 |
| 2,106,197 | Wildebour | Jan. 25, 1938 |
| 2,124,783 | Kottemann | July 26, 1938 |
| 2,155,400 | Caminiti | Apr. 25, 1939 |
| 2,310,631 | Hansen | Feb. 9, 1943 |